March 27, 1951     B. J. MAYLAND     2,546,606
SYNTHESIS GAS PREPARATION
Filed May 10, 1948
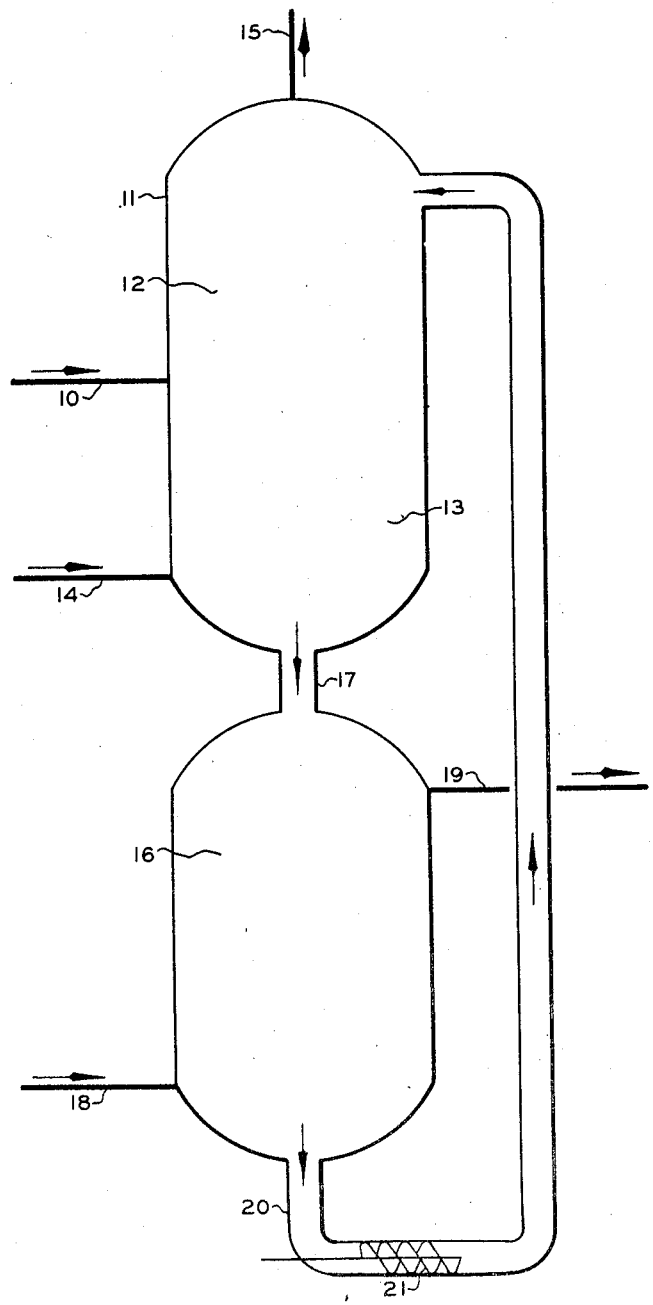
INVENTOR.
B.J. MAYLAND
BY *Hudson & Young*
ATTORNEYS Patented Mar. 27, 1951

2,546,606

UNITED STATES PATENT OFFICE 2,546,606

SYNTHESIS GAS PREPARATION

Bertrand J. Mayland, Bartlesville, Okla., assignor to Phillips Petroleum Company, a corporation of Delaware Application May 10, 1948, Serial No. 26,161

5 Claims. (Cl. 252—373)

This invention relates to a process for the manufacture of synthesis gas. In one of its more specific aspects, it relates to the production of synthesis gas containing carbon monoxide and hydrogen in the mol ratio of 1:2.

The production of carbon monoxide-hydrogen synthesis gas has been carried out in many different ways and for many different purposes. By varying the reactants, various proportions of carbon monoxide and hydrogen may be obtained, depending on the materials which are to be synthesized. The most common volume ratios of carbon monoxide to hydrogen produced are 1:1, 1:2, and 1:3, and of these, probably the most often used is 1:2 for the synthesis of hydrocarbons by the Fischer-Tropsch method.

Table I below shows various equations known to the art for the preparation of synthesis gas showing the ratios of carbon monoxide to hydrogen which may be obtained. It may be seen that a mol ratio of 1:2 can be obtained by combining various of the equations or by reaction (4) or (5) singly. It is not feasible to prepare 1:2 synthesis gas from carbon and steam as shown in Equation 1. Likewise methane and steam will not work in the desired manner because they give a ratio of 1:3. The reaction of carbon dioxide with methane is not advantageous because the ratio is 1:1 and also because carbon dioxide, although freely available in flue gases and process streams as well as in some natural gases, is relatively expensive to recover and power is consumed in its recovery. As mentioned above, a mol ratio of 1:2 may be obtained by the reactions indicated in Equations (4) and (5), however, these also have definite disadvantages. The former, requiring oxygen, is expensive to operate, requiring in addition to the apparatus for producing synthesis gas, an oxygen plant. The latter, utilizing air to furnish oxygen, gives a gas mixture contaminated with a large quantity of nitrogen.

Table I (1) $C + H_2O \rightarrow CO + H_2$ Ratio=1:1
(2) $CH_4 + H_2O \rightarrow CO + 3H_2$ Ratio=1:3
(3) $CH_4 + CO_2 \rightarrow 2CO + 2H_2$ Ratio=1:1
(4) $CH_4 + \frac{1}{2}O_2 \rightarrow CO + 2H_2$ Ratio=1:2
(5) $CH_4 + \frac{1}{2}O_2 + 2N_2 \rightarrow CO + 2H_2 + 2N_2$ Ratio=1:2

Many processes for the manufacture of synthesis gas have been devised. For example: one process is to pass the reactants through a ceramic-lined chamber which has previously been heated to the desired temperature by such means as hot flue gases or the combustion of materials therein; another process is to pass the reactants through suitable pipes which are heated externally; and still another process is to introduce the reactants to a suitable chamber heated internally. There are many variations of these processes.

An object of this invention is to provide a method for making carbon monoxide and hydrogen synthesis gas in a ratio of carbon monoxide to hydrogen of approximately 1:2. Another object is to make synthesis gas relatively free from contamination. Another object is to make synthesis gas from natural gas and steam. Another object is to make economically carbon monoxide-hydrogen synthesis gas in the ratio of 1:2 from carbon, methane and steam. Another object is to make carbon monoxide-hydrogen synthesis gas utilizing a pebble heater. Further objects and advantages of this invention will be apparent to one skilled in the art from the accompanying disclosure and discussion.

I have discovered an improved process for the manufacture of carbon monoxide and hydrogen synthesis gas, preferably in the volume ratio of 1:2, from natural gas and steam, utilizing a pebble heater through which is continually circulated a moving mass of pebbles and wherein natural gas is cracked in one zone, thus depositing a layer of carbon on the pebbles passing therethrough, and natural gas and steam are reformed in a second zone in the presence of the carbon-covered pebbles utilizing the carbon thereon, producing synthesis gas in the desired ratio. This process combines reactions (1) and (2) of Table I in an advantageous manner.

In a preferred embodiment of my invention natural gas and air are burned in the top portion, or combustion zone, of a pebble heater, thus heating the pebbles flowing downwardly therethrough. A second stream of natural gas contacts the heated pebbles in a lower portion of this same chamber and is cracked under such conditions as to form carbon and cause it to adhere to the pebbles. The hydrogen produced passes upward freely in countercurrent flow to the flow of pebbles and is burned along with the natural gas in the combustion zone thus giving additional heat. The heated pebbles upon which carbon has been deposited pass freely into a lower reforming chamber where they are contacted with natural gas and steam which reacts with the carbon, producing carbon monoxide and hydrogen synthesis gas in the ratio of 1:2 according to the following equation: (6) $C + CH_4 + 2H_2O \rightarrow 2CO + 4H_2$ Ratio=1:2. Uncontaminated synthesis gas is withdrawn from the reforming chamber for use as desired, such as Fischer-Tropsch synthesis. The pebbles, which have become cooled by supplying heat for the reforming reaction, are removed from the bottom of the reforming chamber and returned to the top of the pebble heater chamber.

The term "pebbles" as used herein refers to a fluent, particulate mass of refractory elements. These pebbles are preferably substantially spherical and relatively uniform in size, but may be rod shaped or irregular in shape or size. Spheres of about ⅛ inch to 1 inch in diameter are suitable and those of ¼ inch to ½ inch are usually preferred. In cracking organic materials at elevated temperatures, pebbles of highly refractory character and ruggedness must be utilized. In conducting endothermic reactions at elevated temperatures such as the production of carbon monoxide and hydrogen synthesis gas discussed herein it is important to operate with pebbles of relatively high specific heat in order to introduce sufficient heat for the reaction. Pebbles of pure alumina fired at temperatures between 3000 and 3500° F. are suitable for use in this invention. Other materials such as beryllia, silicon carbide, mullite, periclase, and zirconia are also satisfactory. Under certain conditions it may be desirable to impregnate pebbles of the above-named materials with a catalyst such as iron or nickel which will help promote the reactions.

A more detailed understanding of some of the many aspects of my invention may be had by referring to the attached schematic flow diagram in conjunction with the following discussion which will also serve to exemplify my invention. Various additional valves, pumps, and other conventional equipment, necessary for the practice of this invention, will be familiar to one skilled in the art and have been omitted from the drawing for the sake of clarity. This description of the drawing provides one method of operating my process. It is understood, however, that while this is representative in general of my process, various minor changes may be made in adapting the process to the various conditions within the scope of the invention.

In the drawing, reactor 11, through which is passed a contiguous mass of pebbles, comprises an upper combustion zone 12 and a lower cracking zone 13, with free communication between both zones. A mixture of air and natural gas is introduced through line 10 into the lower portion of combustion zone 12 where it burns, heating the downwardly flowing mass of pebbles. The pebbles may be heated to a temperature up to 3000° F. but preferably up to 2500° F. From combustion zone 12, the pebbles pass directly to cracking zone 13, where they countercurrently contact natural gas introduced into the lower portion of the zone through line 14. The natural gas which comprises primarily methane is cracked upon contacting the heated pebbles, carbon depositing on the pebbles and hydrogen and other combustible materials passing upward to the combustion zone, where they are burned. The combustion products are withdrawn through line 15 along with flue gases from the combustion of the natural gas. The cracking reaction is endothermic and therefore absorbs heat from the pebbles thereby cooling same to a temperature ordinarily within the approximate range of 1800 to 2300° F.

From reactor 11 the hot pebbles are passed to a reforming zone 16 through suitable equipment such as pebble throat 17. The pebbles also pass through the reforming zone in a contiguous mass. A mixture of steam and natural gas is introduced into the lower portion of reforming zone 16 through line 18 where it contacts countercurrently the hot pebbles upon which carbon has been deposited. There the natural gas, steam, and carbon are converted to carbon monoxide and hydrogen in a mol ratio of 1:2. The desired molar proportions of the reactants are readily determinable from the equations previously discussed. A suitable pressure differential is maintained between pebble heater 11 and reforming zone 16 so that there will be no flow of combustion gases into the reforming zone to contaminate the synthesis gas. This is done by maintaining a slightly greater pressure in the reforming zone than in the pebble heater so that if there is any flow of gases from one zone to the other it will be from, rather than into, the reforming zone. The synthesis gas produced in zone 16 is removed through line 19 to suitable storage means or to suitable reaction equipment, not shown. During the course of the reforming step the pebbles, which reach the reforming zone at a temperature of about 1800 to 2300° F., are cooled to a temperature of about 500° F. The cooled pebbles are removed from the bottom of zone 16 through line 20 and are passed through suitable elevation apparatus, such as a screw conveyor indicated at 21, to the top of reactor 11 where they are again heated and passed downwardly. Other types of elevation apparatus, such as chain-and-bucket conveyors or gas lifts may be used if desired.

Higher temperatures may be maintained within the cracking and reforming zones by preheating the natural gas and natural gas-steam mixture introduced to each, respectively, by means not shown. It is often desirable to preheat these two streams, preferably indirectly, with the hot flue gases removed from combustion zone 12 through line 15 and/or with hot synthesis gas removed from reforming zone 16 through line 19. The process as described will ordinarily be conducted at approximately atmospheric pressure or slightly higher. It may however be conducted at reduced pressures or at substantial superatmospheric pressures if desired. The several feed streams are ordinarily available at pressures ranging from atmospheric to about 500 p. s. i.

It may be seen from the above description and discussion that my invention is a novel method for the continuous production of 1:2 carbon monoxide-hydrogen synthesis gas. It is an economical process because there are no periods of shut down for reheating the cracking zone, and difficulties inherent in heating metal pipes or reaction tubes to temperatures in the range of 17 to 2500° F. are reduced or eliminated. Most important of all is the fact that my invention is a continuous process for producing synthesis gas free of impurities and inert diluents.

Although this process has been described and exemplified in terms of its preferred modifications, it is understood that various changes may be made without departing from the spirit and scope of the disclosure and of the claims.

I claim:

1. An improved process for the preparation of synthesis gas containing carbon monoxide and hydrogen in a mol ratio of 1:2, which comprises burning a mixture of methane and air in an upper portion of a pebble heating zone and thereby heating pebbles passing downwardly therethrough to a temperature up to about 2500° F., introducing methane to a lower portion of said pebble heating zone and cracking same therein by contacting with the heated pebbles in such a manner that carbon is deposited upon said pebbles and the temperature of said pebbles is reduced to within a range of about 1700 to 1900° F., passing hydrogen formed by said cracking countercurrent to the flow of said pebbles and mixing and burning same with said mixture of methane and air in said upper portion of said pebble heating zone to supply additional heat to said pebbles, passing said heated pebbles upon which carbon is deposited to a reforming zone wherein they are contacted countercurrently with a mixture of methane and steam in a mol ratio of carbon to methane to steam of 1:1:2 and under such conditions as to form carbon monoxide and hydrogen synthesis gas in a mol ratio of 1:2 by the interreaction of said carbon, said steam and said methane, said reaction cooling said pebbles to about 500° F., removing said pebbles from the bottom of said reforming zone and recycling same to the top of said pebble heating zone, and recovering carbon monoxide and hydrogen synthesis gas effluent from said reforming zone as a product of the process.

2. An improved process for the preparation of synthesis gas containing carbon monoxide and hydrogen in a mol ratio of 1:2, which comprises burning a mixture of natural gas and air in an upper portion of a pebble heating zone and thereby heating pebbles passing therethrough to a temperature in the range of 2500 to 3000° F., introducing natural gas to a lower portion of said pebble heating zone and cracking same therein by contacting with the heated pebbles in such a manner that carbon is deposited upon said pebbles and the temperature of said pebbles is reduced to within a range of about 1700 to 2300° F., mixing and burning hydrogen formed by said cracking with said mixture of natural gas and air in said pebble heating zone to supply additional heat to said pebbles, passing said heated pebbles upon which carbon is deposited to a reforming zone wherein they are contacted countercurrently with a mixture of natural gas and steam in a mol ratio of carbon to natural gas to steam of 1:1:2 and under such conditions as to cool said pebbles and form carbon monoxide and hydrogen synthesis gas in a mol ratio of 1:2 by the interreaction of said carbon, said steam, and said natural gas, removing said pebbles from the bottom of said reforming zone and recycling same to the top of said pebble heating zone, and recovering carbon monoxide and hydrogen synthesis gas effluent from said reforming zone as a product of the process.

3. An improved process for the preparation of synthesis gas containing carbon monoxide and hydrogen in a mol ratio of 1:2, which comprises burning a mixture of natural gas and air in an upper portion of a pebble heating zone and thereby heating pebbles passing therethrough to an elevated temperature, introducing natural gas to a lower portion of said pebble heating zone and cracking same therein by contacting with the heated pebbles in such a manner that carbon is deposited upon said pebbles and the temperature of said pebbles is reduced, mixing and burning hydrogen formed by said cracking with said mixture of natural gas and air to supply additional heat, passing said pebbles upon which carbon is deposited to a reforming zone wherein they are contacted with a mixture of natural gas and steam in a mol ratio of carbon to natural gas to steam of 1:1:2 and under such conditions as to form carbon monoxide and hydrogen synthesis gas in a mol ratio of 1:2 by the interreaction of said carbon, said steam, and said natural gas, removing said pebbles from said reforming zone and recycling same to the top of said pebble heating zone, and recovering carbon monoxide and hydrogen synthesis gas from said reforming zone as a product of the process.

4. An improved process for the preparation of synthesis gas containing carbon monoxide and hydrogen in a mol ratio of 1:2, which comprises heating in an upper portion of a pebble heating zone pebbles passing therethrough, cracking natural gas in a lower portion of said pebble heating zone in such a manner that carbon is deposited upon said pebbles, burning hydrogen formed by said cracking to supply additional heat to said pebbles, passing said pebbles upon which carbon is deposited to a reforming zone wherein they are contacted with a mixture of natural gas and steam in a mol ratio of carbon to natural gas to steam of 1:1:2 as to form carbon monoxide and hydrogen synthesis gas in a mol ratio of 1:2, removing said pebbles from said reforming zone and recycling same to said pebble heating zone, and recovering carbon monoxide and hydrogen synthesis gas from said reforming zone as a product of the process.

5. An improved process for the preparation of carbon monoxide and hydrogen synthesis gas which comprises heating in an upper portion of a pebble heating zone pebbles passing therethrough, cracking natural gas in a lower portion of said pebble heating zone in such a manner that carbon is deposited upon said pebbles, passing said pebbles upon which carbon is deposited to a reforming zone wherein they are contacted with a mixture of natural gas and steam in a ratio of carbon to natural gas to steam of 1:1:2 and thereby forming synthesis gas, recycling said pebbles from said reforming zone to said pebble heating zone, and recovering carbon monoxide and hydrogen synthesis gas having a carbon monoxide:hydrogen mol ratio of greater than 1:3 as a product of the process.

BERTRAND J. MAYLAND.

REFERENCES CITED

The following references are of record in the file of this patent:

UNITED STATES PATENTS

| Number | Name | Date |
| --- | --- | --- |
| 1,875,923 | Harrison | Sept. 6, 1932 |
| 1,903,845 | Wilcox | Apr. 18, 1933 |
| 1,977,684 | Lucke | Oct. 23, 1934 |
| 1,992,909 | Davis | Feb. 26, 1935 |
| 2,405,395 | Bahlke et al. | Aug. 6, 1946 |

FOREIGN PATENTS

| Number | Country | Date |
| --- | --- | --- |
| 461,402 | Great Britain | Feb. 16, 1937 |